Aug. 2, 1949.　　　　C. F. HAMMANN　　　　2,477,599
ACTUATING DEVICE

Filed March 18, 1944　　　　　　　　　　　　5 Sheets-Sheet 1

Inventor
Carl F. Hammann
By Rudolf Hamann
Attorney

Aug. 2, 1949.  C. F. HAMMANN  2,477,599
ACTUATING DEVICE
Filed March 18, 1944   5 Sheets-Sheet 2

Inventor
Carl F. Hammann
By [signature]
Attorney

Aug. 2, 1949.　　　　　C. F. HAMMANN　　　　　2,477,599
ACTUATING DEVICE
Filed March 18, 1944　　　　　　　　　　　　5 Sheets-Sheet 3

Inventor
Carl F. Hammann
By Rudolf Hamann
Attorney

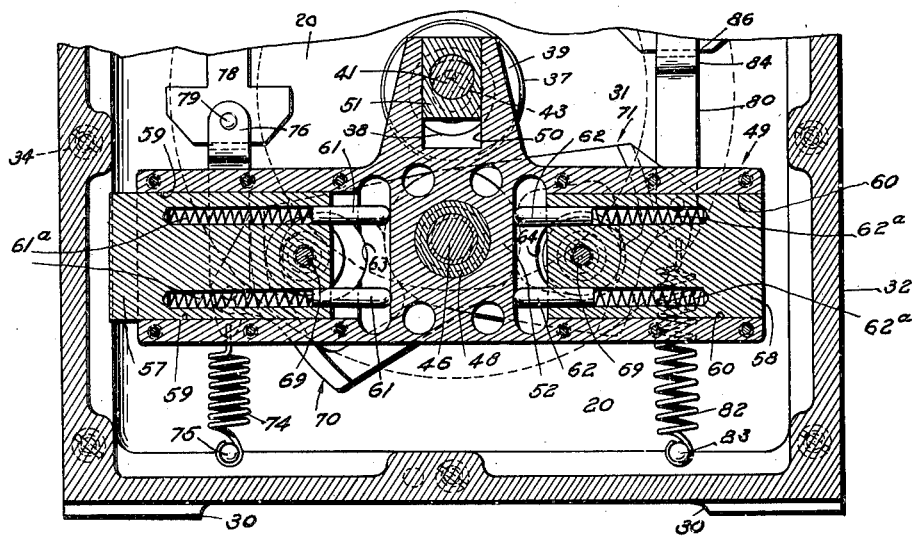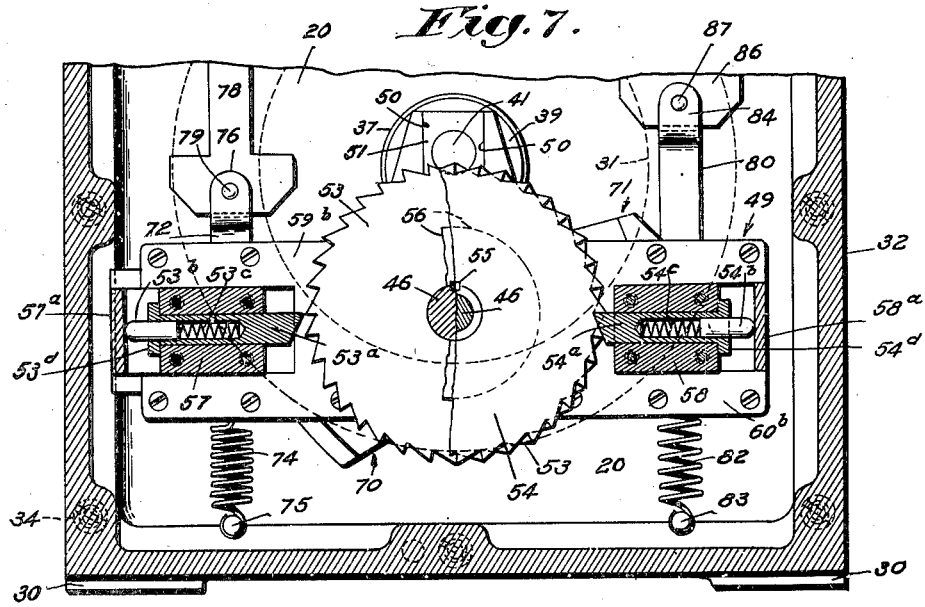

Aug. 2, 1949.  C. F. HAMMANN  2,477,599
ACTUATING DEVICE
Filed March 18, 1944  5 Sheets-Sheet 5

Inventor
Carl F. Hammann
By Ludwig Hammann
Attorney

Patented Aug. 2, 1949

2,477,599

UNITED STATES PATENT OFFICE 2,477,599

ACTUATING DEVICE

Carl F. Hammann, Boston, Mass., assignor to Photoswitch, Incorporated, Cambridge, Mass., a corporation of Massachusetts Application March 18, 1944, Serial No. 527,135

12 Claims. (Cl. 74—116)

The present invention relates to actuating devices of the mechanical relay type, and more particularly to a reversible actuating mechanism for use in regulating or controlling other equipment such as article or web feeding equipment, registering apparatus for printing presses and cutting machinery, machine tools and many other types of machinery requiring continuous or intermittent regulation.

It is often necessary or desirable to actuate auxiliary equipment such as regulating apparatus requiring considerable energy for operation, under the control of impulses of comparatively low energy, such as derived from arrangements responding to electric switches, either automatically operated as limit switches, or manually operated as by push button, or to photoelectric cells or other electrical detecting apparatus.

Many methods of operating such auxiliary equipment have been proposed, including hydraulic servomotors, electric regulating motors, and mechanical drives. Such apparatus very often is not sufficiently free of defects such as inertia, time lag and inaccuracy, or if these are avoided, is cumbersome, delicate and expensive, especially if quickly reversible motion is required.

Some of the principal objects of my invention are to provide a mechanical auxiliary actuating device which responds instantaneously, which is able to introduce considerable driving energy into a control system, which is not damaged by conflicting actuating impulses, which is very rugged and compact and lends itself well for installation upon or close to machinery to be controlled, and for actuation by any desirable control impulses especially also comparatively weak electrical currents.

Figure 1:
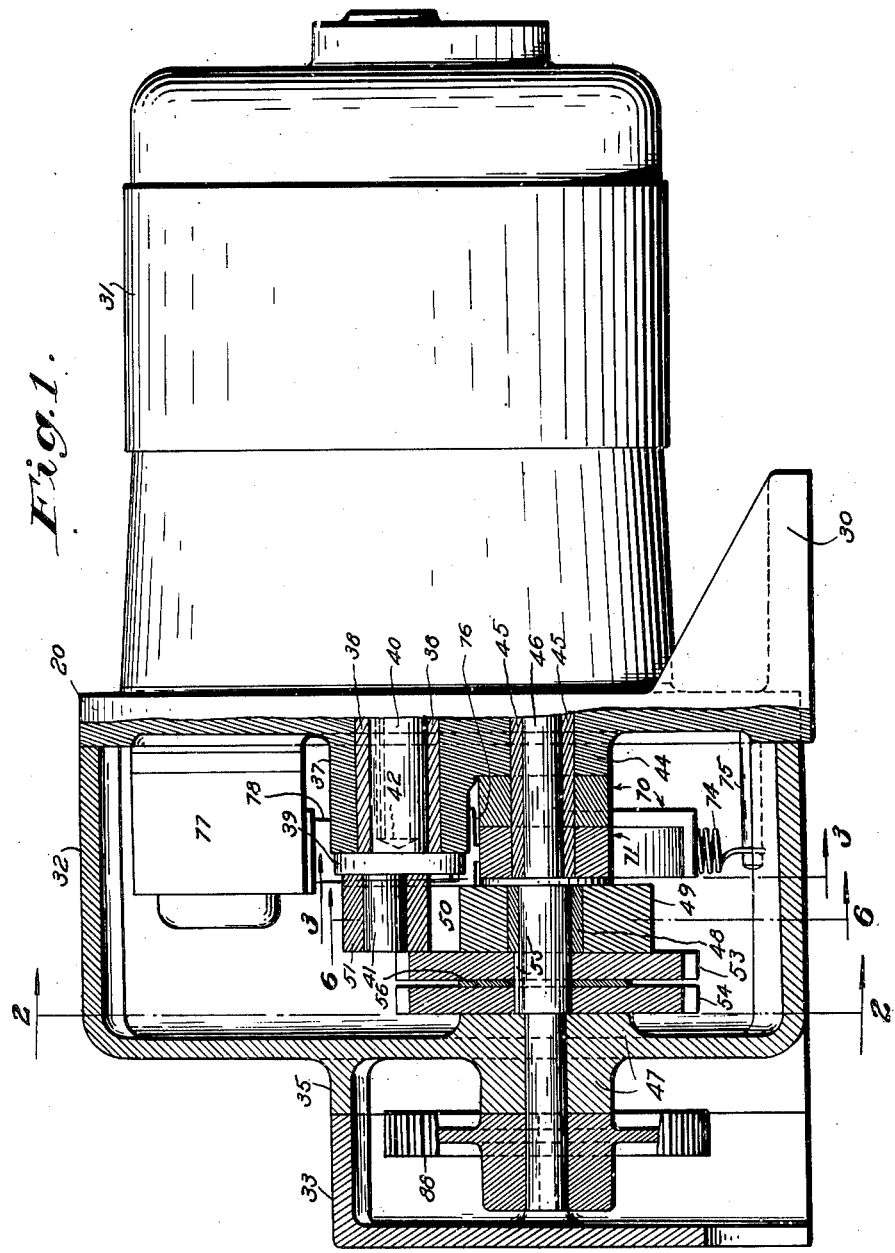
Figure 2:
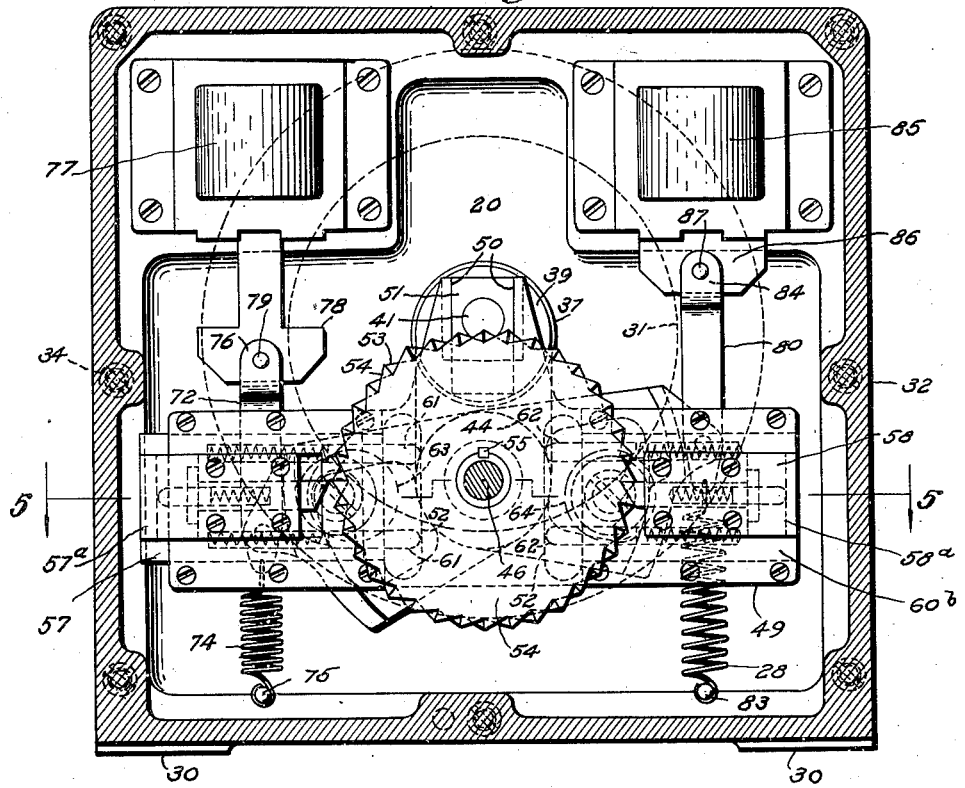
Figure 3:
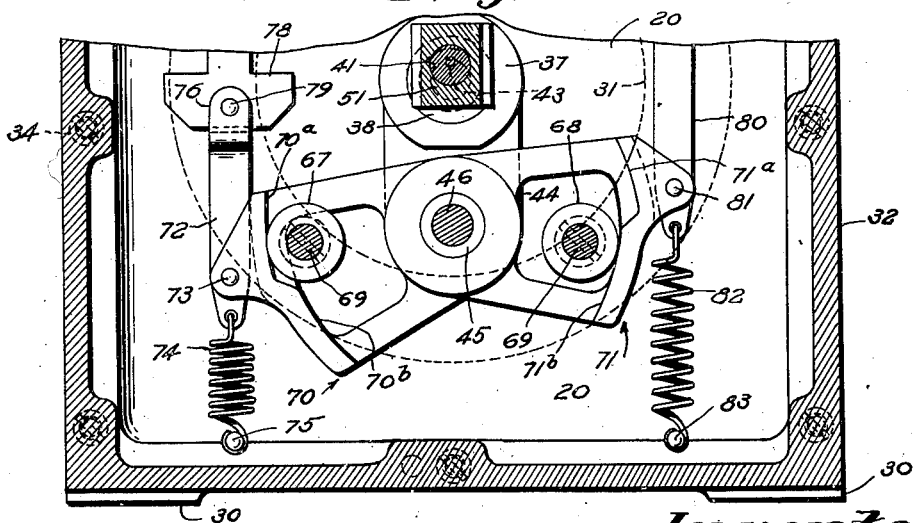
Figure 4:
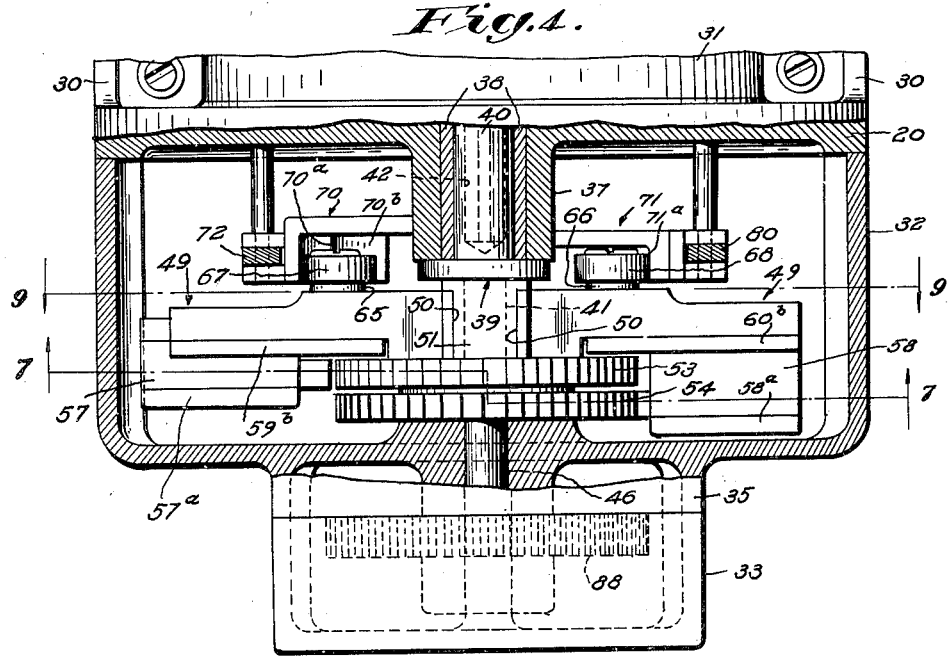
Figure 5:
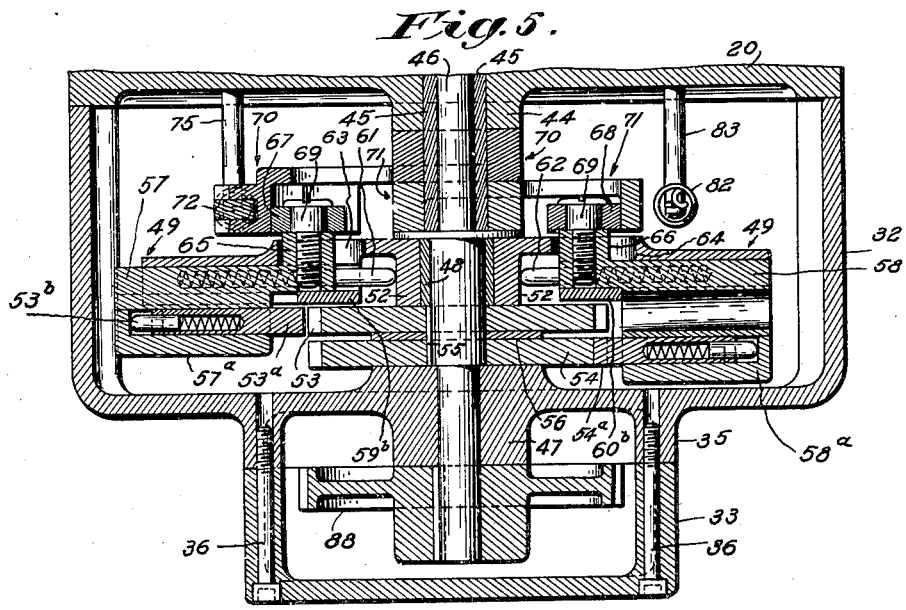
Figure 8:
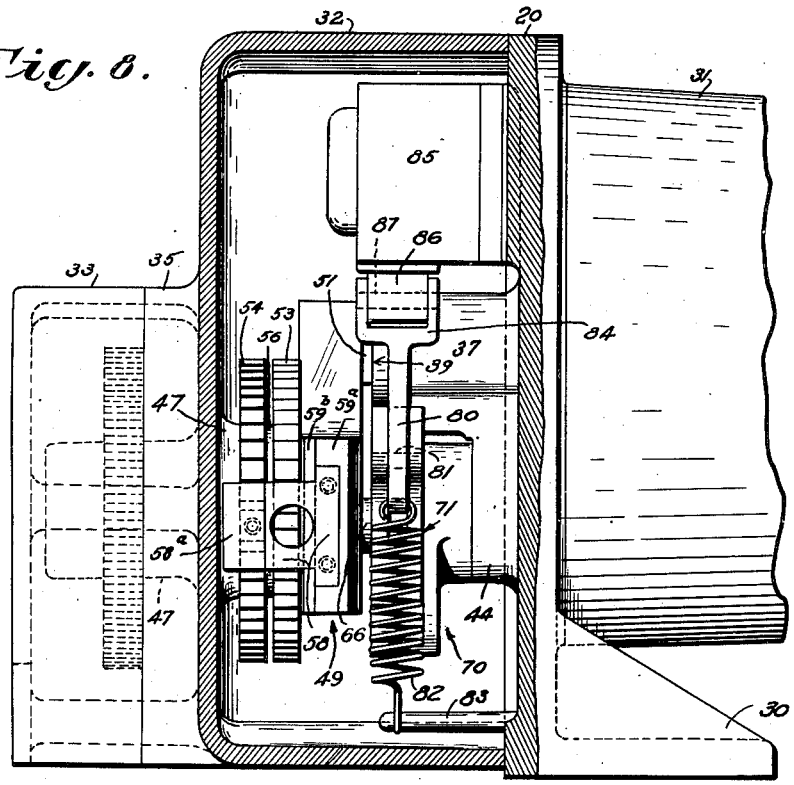

These and other objects and aspects will be more fully apparent from the following description of a practical embodiment illustrating the genus of the invention. The description refers to a drawing in which Fig. 1 a partial central vertical cross-section, portions of which are shown in elevation;

Fig. 2 a cross-section taken on line 2—2 of Fig. 1, portions of which are shown in elevation;

Fig. 3 a fragmentary cross-section taken on line 3—3 of Fig. 1 particularly illustrating the pivoted cams and cam rolls;

Fig. 4 a fragmentary plan view of the apparatus, portions of which have been cut away whereas others are shown in cross-section on line 5—5 of Fig. 2;

Fig. 5 a fragmentary cross-section taken on line 5—5 of Fig. 2, some portions being shown in elevation;

Fig. 6 a fragmentary cross-section taken on line 6—6 of Fig. 1, some portions being shown in elevation;

Fig. 7 another fragmentary cross-section, portions of which are shown in elevation and other portions being broken away;

Fig. 8 a fragmentary partial side elevation and cross section, and

Figure 9:
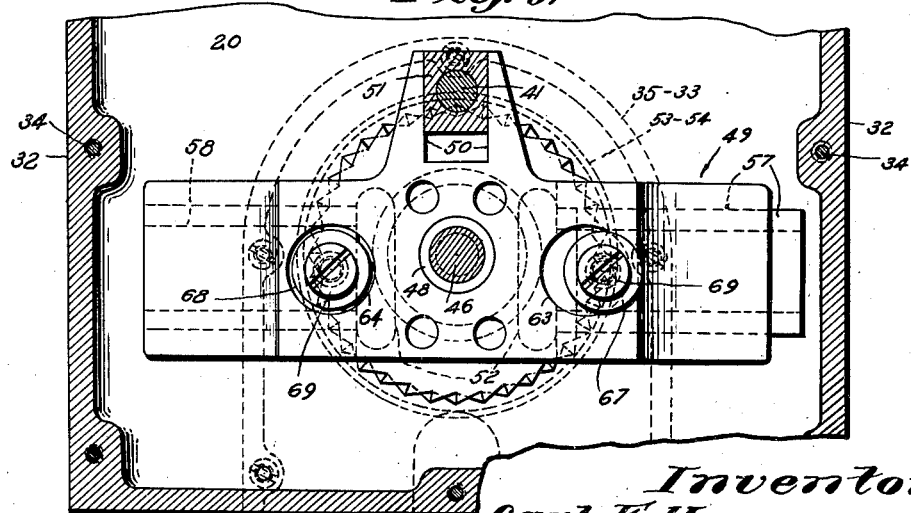

Fig. 9 another fragmentary cross-section taken on line 9—9 of Fig. 4 particularly showing the back elevation of the rocker with the cam rolls protruding through openings provided therefor.

In the drawings, 20 indicates a supporting plate or block with mounting flanges 30 to one side of which is fastened an electric motor 31 with shaft 42 which constitutes the driving energy source of the device (Figs. 1, 4, 5, and 8). Other driving means such as belt or gear drives may be substituted for motor 31 if desired and found to be more suitable under existing conditions. On the other side of plate 20 are provided housing members 32 and 33. Member 32 is directly attached to plate 20 by means of screws 34 (Fig. 2) seated in the supporting plate. The front end of housing 32 is provided with a rim 35 (Figs. 1, 4, 5) to which is attached housing cover 33 by means of screws 36 seated in rim 35 (Fig. 6). The cover 33 and rim portion 35 form a gear chamber which is open at its bottom so that any suitable gear train may be engaged with the spur gear located in this compartment.

In actual use, the mechanism mounted within the housing 32 is partially submerged in lubricating oil, the chamber defined by the plate 20 and the housing 32 being oiltight.

Mounting block 20, to which motor 31 is attached, has hub portion 37 with a bushing 38. Journalled in bushing 38 is a crank shaft 39 having a shaft portion 40 and a crank pin 41 (Figs. 1, 2, 3, 6, 7) slightly excentric with regard to shaft portion 40 of member 39 which is recessed to receive the end of the motor shaft 42 to which it is keyed at 43.

Below the hub 37 of plate 20 is located a second bearing 44 containing a bushing 45 in which is journalled the rear end of the main drive shaft 46, the front end of which is journalled in the bearing of a hub 47 of housing cover 32 (Figs. 1, 4, 5) and which constitutes a transmission member from which controlling energy may be derived in any suitable manner.

On the main drive shaft 46 sits, directly below the crank pin 41, a pawl rocker or oscillator 49 which is journalled on the drive shaft 46 by means of a bushing 48 (Figs. 1, 5, 6, 7). The upper central portion of the rocker comprises rocker slide-ways 50 (Fig. 6) containing the crank-pin gyratory slide 51 which is journalled on the crank pin 41. Thus, when the motor 31 is in operation, the gyratory slide 51 moved in the slide-ways 50 by crank pin 41 causes the member 49 to rock from one side to the other, thereby producing an oscillating action.

Between the hub portion 52 of the pawl rocker 49 and the bearing hub portion 47 of the housing 32 are mounted two ratchet-toothed discs 53 and 54 which form the driven members of a coupling and both of which are keyed at 55 to the drive shaft 46 and spaced apart from each other by means of the washer 56. The ratchet teeth on the discs or wheels 53 and 54 are pitched oppositely to each other, as clearly shown in Fig. 7 in which a portion of the disc 54 has been cut away to show the rear disc 53. This figure also shows ratchet pawls 53a and 54a which are adapted to engage the ratchet teeth of the discs 53 and 54 respectively when actuated by connecting mechanism as will be explained presently, and which pawls constitute the driving members of the coupling which comprises also the above ratchet wheels 53, 54.

Figs. 5 to 8 show the pawl actuators 57 and 58 which engage and disengage the pawls 53a and 54a. The pawl actuators 57 and 58 are blocks slidably engaged in actuator slide-ways 59 and 60 respectively, located in the oscillating pawl rocker 49, and are provided with spring plungers 61 and 62 respectively, which slide in holes within the pawl actuators and the free, rounded ends of which bear against the side walls of the rocker hub 52 (Fig. 6).

As shown in Figs. 2 and 4 to 8, the pawl actuators 57, 58 are T-shaped blocks which slide with their flanges in grooves formed by the depending flanges 59a which form actuator slide-ways 59, 60 and U-shaped retaining pieces 59b screwed to slide-way flanges 50a. The outer faces of actuator blocks 57, 58 are recessed to receive the pawls to be described presently, which pawls are confined by L-shaped cover pieces 57a, 58a. The pawl actuators 57 and 58 are normally maintained in disengaged position, as shown at the left-hand side of the figures, by means of the compression springs 61a and 62a respectively, which are located at the back end of the plungers within the plunger guiding holes. In similar manner, the pawls 53a and 54a, carried in pawl actuators 57, 58, are normally urged inwardly by means of the plunger and spring 53b and 53c in pawl 53a, and plunger and spring 54b and 54c in pawl 54a, respectively. It will thus be seen that while the actuators 57 and 58 are normally pushed outwardly in opposite directions, the pawls 53a and 54a are normally pushed inwardly toward each other.

Pawls 53a and 54a are provided with flanges 53d, 54d which limit the inward movement of the pawls, for reasons which will appear hereinbelow.

As shown in Figs. 5 and 9, openings 63 and 64 are provided through the back of the rocker 49 through which protrude hub portions 65 and 66, respectively, of the pawl actuators 57 and 58. Mounted on the hubs 65 and 66 of the actuators are cam rolls 67 and 68 respectively, which are secured in place by means of the shouldered screws 69.

Journalled on the main drive shaft 46 are oscillating cam levers, generally indicated at 70 and 71 (Figs. 3, 4, 5). The cam 70 is provided with an internal stepped track, the low portion being indicated at 70a and the high portion at 70b. The cam roll 67 is adapted to engage the high and low portions of the track of the cam 70 and in a similar manner cam roll 69 is adapted to engage the high and low track portions 71a and 71b respectively of the cam 71, so that relative movement of roll and cam accordingly shifts the position of pawl 53a relatively to ratchet wheel 53.

The cams 70 and 71 can be independently moved, as follows. Attached to the cam 70 is a link member 72 which is pivoted to the cam by means of the pin 73. Attached to the lower end of link 72 is a tension spring 74 which is anchored to a post 75 secured to plate 20. The upper end of the link 72 is shaped to form a yoke 76. Mounted on the upper portion of the central supporting plate 20 is an electromagnetic solenoid 77 with a magnetic core member 78. The yoke portion 76 of the link 72 is pivoted to the lower end of the core member 78 by means of the pin 79. Thus, when the solenoid is energized, the core member 78 will move up and the cam 70 will pivot on the shaft 46 against the tension of spring 74. When the solenoid 77 is deenergized, the spring 74 will pull the cam 70 down, as shown in the drawings. Similarly, cam 71 is provided with a link 80 and pin 81, tension spring 82, anchor pin 83, yoke 84, solenoid 85, solenoid core 86, and pivot pin 87. When the solenoid 85 is energized, the cam 71 is pivoted upwardly on the shaft 46.

Throughout the drawings the solenoid 77 is shown deenergized and the solenoid 85 energized, which places the cam 70 into lowered position while the cam 71 is in elevated position. In these respective positions cam roll 67 and pawl slide 57 are pushed outwardly by the plunger springs 61a since the cam roll 67 is permitted to engage the low cam track portion 70a, thereby holding the pawl 53a out of engagement with the ratchet teeth of disc 53. On the other hand, due to the fact that the cam 71 is in its elevated position, the cam roll 68 is engaged by the high track portion 71b causing the pawl actuator 58 to move inwardly thereby bringing the pawl 54a into engagement with the ratchet teeth of the disc 54, as shown in Fig. 7.

Keyed to the end of the shaft 46 is the gear 88 such that ratchet discs 53 and 54 cause the gear 88 to move in one or the other sense, respectively. The bottom of the housing cover 33 and rim 35 of the housing being open, any suitable gear train may be engaged with gear wheel 88.

The above-described embodiment of my invention operates as follows.

Assuming that the electric motor 31 is operating, the crank shaft 40 which is directly connected to the motor revolves, and due to the reciprocating movement of the crank-pin gyratory slide 51 in the slideway 50 of rocker 49 the latter will oscillate continuously while the motor is in operation. If neither of the solenoids is energized, both cams 70 and 71 are in lowered position; therefore the cam rolls 67 and 68 are engaged with the low track cam portion 70a and 71a respectively, with the result that both slides 57 and 58 are moved outwardly so that pawls 53a and 54a cannot engage the ratchet teeth of the discs 53 and 54, respectively. Under these conditions the rocker 49 oscillates freely but the drive shaft 46 and gear 88 do not move.

If, however, one of the solenoids, for example 85, is energized, the core member 86 moves upwardly, as shown in Fig. 2, thereby pulling up the cam 71 to the position shown in Fig. 3. This action of the cam 71 causes the cam roll 68 to be suddenly thrust inwardly toward the drive shaft 46 into the position shown in the drawings, throwing the pawl 54a under one of the ratchet teeth of the disc 54. Due to the fact that the rocker 49 oscillates continuously, the pawl 54a will turn the ratchet disc, drive shaft 46 and gear 88 in counterclockwise direction, the maximum rotatory travel being equal to the spacing of one tooth on the disc 54, which for example in a 36-toothed disc would be ten degrees, assuming that the rocker travel covers a single tooth. On the reverse movement of rocker 49 the pawl 54a, due to functioning of plunger 54b and spring 54c, slides over the next tooth on the disc and snaps under it into position for turning the disc, shaft, and gear 88 another tooth. However, should the solenoid 85 become deenergized at any time, the cam 71 will drop, allowing the cam roll to snap back into the low track portion 71a of cam 71 thereby withdrawing the pawl 54a from engagement with the disc 54, which will stop further movement of the gear 88. This retraction of pawl 54a may take place at any time during the movement of the disc, as the case may be, depending on the time when solenoid 85 is deenergized.

It will now be evident that the other, parallel transmission train, namely that from solenoid 77 through cam 70, roll 67, actuator 57, pawl 53, ratchet disc 53, to gear wheel 88, functions in the manner described above for the other half of the present device, with the difference that energization of solenoid 77 causes rotation of wheel 88 in clockwise direction. Thus, energization of one solenoid or the other will instantaneously cause rotation of wheel 88 in one or the other direction, which motion is immediately stopped upon deenergization of the respective solenoid. Since any desired speed ratio between the motion of shaft 46 and that of the controlled apparatus can easily be provided by conventional transmission links, the permitted minimum error or tolerance in regulatory movement can be kept above the magnitude of one step of the present device, corresponding in the above-described example to a ten-degree rotation.

With both solenoids deenergized, wheel 88 is at rest and free to rotate in either direction.

With both solenoids energized, the rocker 49 is locked to both ratchet wheels, and shaft 46 performs an oscillatory movement corresponding to the rocking angle.

It should be understood that the present disclosure is for the purpose of illustration only and that this invention includes all modifications and equivalents which wall within the scope of the appended claims.

I claim:

1. A reversible actuating mechanism comprising a housing, a driving shaft journalled in said housing, a driven shaft mounted in said housing, a rocker journalled on said driven shaft, a slide way mounted on said rocker, a crank member journalled in said slide way and drivingly connected to said driving shaft, right and left-hand pawl ratchet wheels fixed to said driven shaft, right and left-hand pawl actuators mounted in said rocker, right and left-hand pawls resiliently mounted in said pawl actuators, said pawls being adapted to engage said right and left-hand pawl ratchet wheels respectively, resilient means tending to retain said pawl actuators in positions which hold said pawls disengaged from said ratchet wheels, independent right and left-hand cam levers journalled on said driven shaft and having cam tracks, cam rolls mounted on said pawl actuators and engaging said cam tracks, cam actuators mounted on said housing and connected to said cam levers, and means for returning said cam levers to normal positions.

2. A reversible actuating mechanism comprising a mounting plate, an electromotor fastened to one side of said plate with its driving shaft extending therethrough, a housing fastened to the other side of said plate, a driving shaft journalled in said housing, a driven shaft mounted in said housing parallel to said driving shaft, a rocker journalled on said driven shaft, a slide way mounted on said rocker, a crank member connected to said driving shaft and journalled in said slide way, right and left-hand pawl ratchet wheels fixed to said driven shaft, right and left-hand pawl actuators mounted in said rocker, right and left-hand pawls resiliently mounted in said pawl actuators, said pawls being adapted to engage said right and left-hand pawl ratchet wheels respectively, independent right and left-hand cam levers journalled on said driven shaft and having cam tracks, cam rolls mounted on said pawl actuators and engaging said cam tracks, and cam actuating solenoids mounted on said housing and connected to said cam levers.

3. An intermittent actuating mechanism comprising a housing, a driving shaft journalled in said housing, a driven shaft mounted in said housing, a rocker journalled on said driven shaft, a slide way mounted on said rocker, a crank member journalled in said slide way and drivingly connected to said driving shaft, a ratchet wheel fixed to said driven shaft, a pawl actuator mounted in said rocker, a pawl resiliently mounted in said pawl actuator, said pawl being adapted to engage said ratchet wheel, resilient means tending to retain said pawl actuator in a position which holds said pawl disengaged from said ratchet wheel, a cam lever journalled on said driven shaft and having a cam track, a cam roll mounted on said pawl actuator and engaging said cam track, and a cam actuator mounted on said housing and connected to said cam lever.

4. A reversible actuating mechanism comprising a housing, a driving shaft journalled in said housing, a driven shaft likewise journalled in said housing, an oscillator journalled on said driven shaft, means connected to said driving shaft for continuously operating said oscillator, right and left-hand driven coupling members secured to said driven shaft, right and left-hand driving coupling members slidingly mounted in said oscillator for movement into and out of engagement with said driven coupling members, means tending to hold said driving coupling members out of said engagement, independent right and left-hand cam levers journalled on said driven shaft, cam rolls mounted on said driving members and engaging said cams, and independent cam actuators mounted in said housing for moving said driving members into engagement against said holding means.

5. A reversible actuating mechanism comprising a housing, a driving shaft journalled in said housing, a driven shaft likewise journalled in said housing, an oscillator journalled on said driven shaft, a reciprocating driving member for continuously operating said oscillator, right and left-hand drivable members secured to said driven shaft, right and left-hand driving members mounted in said oscillator and adapted drivingly to engage said drivable members when said members are in coupling position, independent right and left-hand cam levers, cam rolls mounted on said driving members and engaging said cams, and independent cam actuators mounted in said housing for moving said driving members into coupling position.

6. In actuating mechanism for reversibly driving a shaft from a continuously driven source of energy, the combination of coupling means fixed to said shaft and adapted to be driven in either direction, an oscillator adapted to be continuously rocked by said energy source, two driivng coupling means shiftably mounted on and moving with said oscillator and adapted drivingly to connect in one of their respective positions said energy source through said oscillator with said driven coupling means and said shaft, and cam means in continuous contact with said driving coupling means for shifting them into and out of said connecting position.

7. In actuating mechanism for intermittently driving a shaft from a continuously driven source of energy, the combination of a driven coupling means fixed to said shaft, an oscillator adapted to be continuously rocked by said energy source about said shaft, a driving coupling means shiftably mounted on and moving with said oscillator and adapted drivingly to connect in one of its positions said energy source through said oscillator with said driven coupling means and said shaft, and cam means in continuous contact with said driving coupling means for shifting it into and out of said connecting position.

8. In actuating mechanism for reversibly driving a rotatable transmission member from a continuously driven source of energy, the combination of an oscillator driven by said energy source, two coupling means slidably mounted on and moving with said oscillator and each adapted drivingly to connect in one of its positions said oscillator with said transmission member by movement radially of said transmission member one coupling means for rotation in one direction and the second for rotation in the other direction, and means in continuous contact with said coupling means for shifting either one of said coupling means into and out of said connecting position.

9. In actuating mechanism for intermittently driving a rotatable circular transmission member from a continuously driven source of energy, the combination of an oscillator driven by said energy source, coupling means slidably mounted on and moving with said oscillator and adapted drivingly to connect in one of its positions said oscillator with said transmission member by movement radially of said transmission member and means in continuous contact with said coupling means for shifting said coupling means into and out of said connecting position.

10. A reversible actuating mechanism comprising a housing, a continuously rotatable shaft journalled in said housing, an intermittently operated drive shaft mounted in said housing, an oscillator pawl slide member journalled on said drive shaft, a gyratory slide member slidably engaged with said oscillator pawl slide member, a crank member journalled in said gyratory slide member being directly connected to said continuously rotatable shaft, right and left-hand pawl ratchet wheels fixed to said drive shaft, resiliently held right and left-hand pawl slides mounted in said oscillator pawl slide member, resiliently held right and left-hand pawls mounted in said pawl slides, said pawls being adapted to engage with said right and left-hand pawl ratchet wheels, independent right and left-hand cam levers journalled on said drive shaft, cam rolls mounted on said pawl slides and engaged with cam tracks located on said cam levers, cam actuators mounted on said housing and connected to said cam levers, and expansible members anchored in said housing connecting with said cam levers for the purpose of returning said cam levers to normal positions.

11. A reversible actuating mechanism comprising a housing, an intermittently operated drive shaft mounted in said housing, an oscillator pawl slide member journalled on said drive shaft, a continuously moving gyratory member slidably mounted in said oscillating member, a crank shaft journalled in said gyratory member and said housing, right and left-hand pawl ratchet wheels fixed on said drive shaft, resiliently held right and left-hand pawl slides mounted in said oscillator pawl slide member, resiliently held right and left-hand pawls mounted in said pawl slides, said pawls being adapted to engage with said right and left-hand pawl ratchet wheels, independent right and left-hand cam levers journalled on said drive shaft, cam rolls mounted on said pawl slides and engaged with cam tracks located in said cam levers, cam actuators mounted in said housing and connected to said cam levers, and expansible members anchored in said housing connecting with said cam levers for the purpose of maintaining said cam levers in a normal position.

12. A reversible actuating mechanism comprising a housing, an intermediately operated drive shaft journalled in said housing, an oscillator operator member journalled on said drive shaft, a continuously moving gyratory member slidably mounted in said oscillator operator member with means located in said housing for continuously operating said gyratory member, right and left-hand drive members secured to said drive shaft, right and left-hand drive member operators resiliently mounted in said oscillator operator member, independent right and left-hand cam levers journalled on said drive shaft, cam rolls mounted on said drive member operators engaging with said cams, and independent cam actuators mounted in said housing.

CARL F. HAMMANN.

REFERENCES CITED

The following references are of record in the file of this patent:

UNITED STATES PATENTS

| Number | Name | Date |
| --- | --- | --- |
| 316,089 | Weston | Apr. 21, 1885 |
| 863,782 | Callan | Aug. 20, 1907 |
| 1,689,882 | MacFarland | Oct. 30, 1928 |